United States Patent
Corti (10) Patent No.: US 9,543,778 B1
(45) Date of Patent: Jan. 10, 2017

(54) DEVICE FOR RECHARGING HEARING AID BATTERIES USING USB DONGLE

(75) Inventor: Deborah Corti, Pampano Beach, FL (US)

(73) Assignee: Starkey Laboratories, Inc., Eden Prairie, MN (US)

(\*) Notice: Subject to any disclaimer, the term of this patent is extended or adjusted under 35 U.S.C. 154(b) by 631 days.

(21) Appl. No.: 13/440,815

(22) Filed: Apr. 5, 2012

Related U.S. Application Data (60) Provisional application No. 61/472,406, filed on Apr. 6, 2011.

(51) Int. Cl.
 *H02J 7/00* (2006.01)
 *H02J 7/02* (2016.01)
 *H02J 5/00* (2016.01)

(52) U.S. Cl.
 CPC ............ *H02J 7/025* (2013.01); *H02J 5/005* (2013.01)

(58) Field of Classification Search
 CPC ........................................ H02J 7/025
 USPC ........................................ 320/108; 361/789
 See application file for complete search history.

(56) References Cited

U.S. PATENT DOCUMENTS

| | | | | |
|---|---|---|---|---|
| 8,259,445 B2* | 9/2012 | Skillman et al. | ......... | 361/679.58 |
| 2004/0204177 A1* | 10/2004 | Pon | ....................... | H02J 7/0045 455/573 |
| 2005/0017675 A1* | 1/2005 | Hsieh et al. | ................. | 320/107 |
| 2005/0041827 A1* | 2/2005 | Wu | ............................... | 381/323 |
| 2005/0173450 A1* | 8/2005 | Maskell | ............. | B65D 83/0445 221/186 |
| 2008/0311955 A1* | 12/2008 | Kim | .................. | H04M 1/72527 455/557 |
| 2009/0065375 A1* | 3/2009 | Winters et al. | .................. | 206/38 |
| 2009/0096413 A1* | 4/2009 | Partovi | .................... | H01F 5/003 320/108 |
| 2009/0200984 A1* | 8/2009 | Meincke | ............... | H04R 25/602 320/107 |
| 2011/0058332 A1* | 3/2011 | Skillman | ............... | G06F 1/1626 361/679.58 |

OTHER PUBLICATIONS

U.S. Appl. No. 13/440,574, Apr. 5, 2012, Device for Recharging Hearing Aid Batteries Using USB Dongle.

\* cited by examiner

*Primary Examiner* — Drew A Dunn
*Assistant Examiner* — Zixuan Zhou
(74) *Attorney, Agent, or Firm* — Schwegman Lundberg & Woessner, P.A.

(57) ABSTRACT

Disclosed herein, among other things, are methods and apparatus for recharging hearing aid batteries using a USB adapter. A system includes a hearing assistance device and a battery recharger. The hearing assistance device includes a rechargeable battery, a recharge coil configured to receive power across a wireless inductive link, and charging circuitry configured to control power received by the recharge coil to recharge the battery. The battery recharger includes a device compartment configured to receive the hearing assistance device, a transmit coil configured to transmit power across the wireless inductive link, and a USB adapter port configured to connect to a USB adapter. The USB adapter is configured to provide power to the recharger.

20 Claims, 10 Drawing Sheets

DEVICE FOR RECHARGING HEARING AID BATTERIES USING USB DONGLE

RELATED APPLICATION

The present application claims the benefit under 35 U.S.C. 119(e) of U.S. Provisional Patent Application Ser. No. 61/472,406, filed Apr. 6, 2011 which is incorporated herein by reference in its entirety.

FIELD OF THE INVENTION

The present subject matter relates generally to hearing assistance devices and in particular to a device for recharging hearing assistance device batteries using a universal serial bus (USB) dongle.

BACKGROUND

Hearing assistance devices, such as hearing aids, are used to assist patients suffering hearing loss by transmitting amplified sounds to ear canals. In one example, a hearing aid is worn in and/or around a patient's ear. Patients generally prefer that their hearing aids are minimally visible or invisible, which requires that the devices are of relatively small size. Hearing aids typically include a housing or shell with internal components such as a microphone, battery and a telecoil. Some hearing aids use rechargeable batteries that require periodic charging to maintain proper device performance. These rechargeable batteries are of such small size that they can be difficult for patients to access for the purpose of recharging.

Accordingly, there is a need in the art for improved apparatus and methods for recharging hearing aid batteries.

SUMMARY

Disclosed herein, among other things, are apparatus and methods for recharging hearing assistance device batteries using a USB dongle (or adapter). In various embodiments, a system includes a hearing assistance device and a battery recharger. The hearing assistance device includes a rechargeable battery, a recharge coil and charging circuitry, in various embodiments. The recharge coil is configured to receive power across a wireless inductive link, and the charging circuitry is configured to control power received by the recharge coil to recharge the battery. The battery recharger includes a device compartment, a transmit coil, a user interface and a USB adapter port, in various embodiments. The device compartment is configured to receive the hearing assistance device, and the transmit coil is configured to transmit power across the wireless inductive link. The user interface is configured to communicate charging progress and error information received by the recharger from the charging circuitry. According to various embodiments, the USB adapter port is configured to connect to a USB adapter, and the USB adapter is configured to provide power to the recharger.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

DETAILED DESCRIPTION

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

The present detailed description will discuss hearing assistance devices using the example of hearing aids. Hearing aids are only one type of hearing assistance device. Other hearing assistance devices include, but are not limited to, those in this document. Hearing assistance devices include, but are not limited, ear level devices that provide hearing benefit. One example is a device for treating tinnitus. Another example is an ear protection device. Possible embodiments include devices that can combine one or more of the functions/examples provided herein. It is understood that their use in the description is intended to demonstrate the present subject matter, but not in a limited or exclusive or exhaustive sense.

Hearing aids typically include a housing or shell with internal components such as a microphone, battery and a telecoil. Some hearing aids use rechargeable batteries that require periodic charging to maintain proper device performance. These rechargeable batteries are of such small size that they can be difficult for patients to access for the purpose of recharging.

Disclosed herein, among other things, are methods and apparatus for recharging hearing aid batteries using a USB adapter. A system includes a hearing assistance device and a battery recharger. The hearing assistance device includes a rechargeable battery, a recharge coil configured to receive power across a wireless inductive link, and charging circuitry configured to control power received by the recharge coil to recharge the battery. The battery recharger includes a device compartment configured to receive the hearing assistance device, a transmit coil configured to transmit power across the wireless inductive link, and a USB adapter port configured to connect to a USB adapter, the USB adapter configured to provide power to the recharger. The USB adapter port can include a micro-USB connector port, a mini-USB connector port, a USB connector port, or any other type of port that will connect to and receive USB-standard power signals, in various embodiments.

Figure 1A:
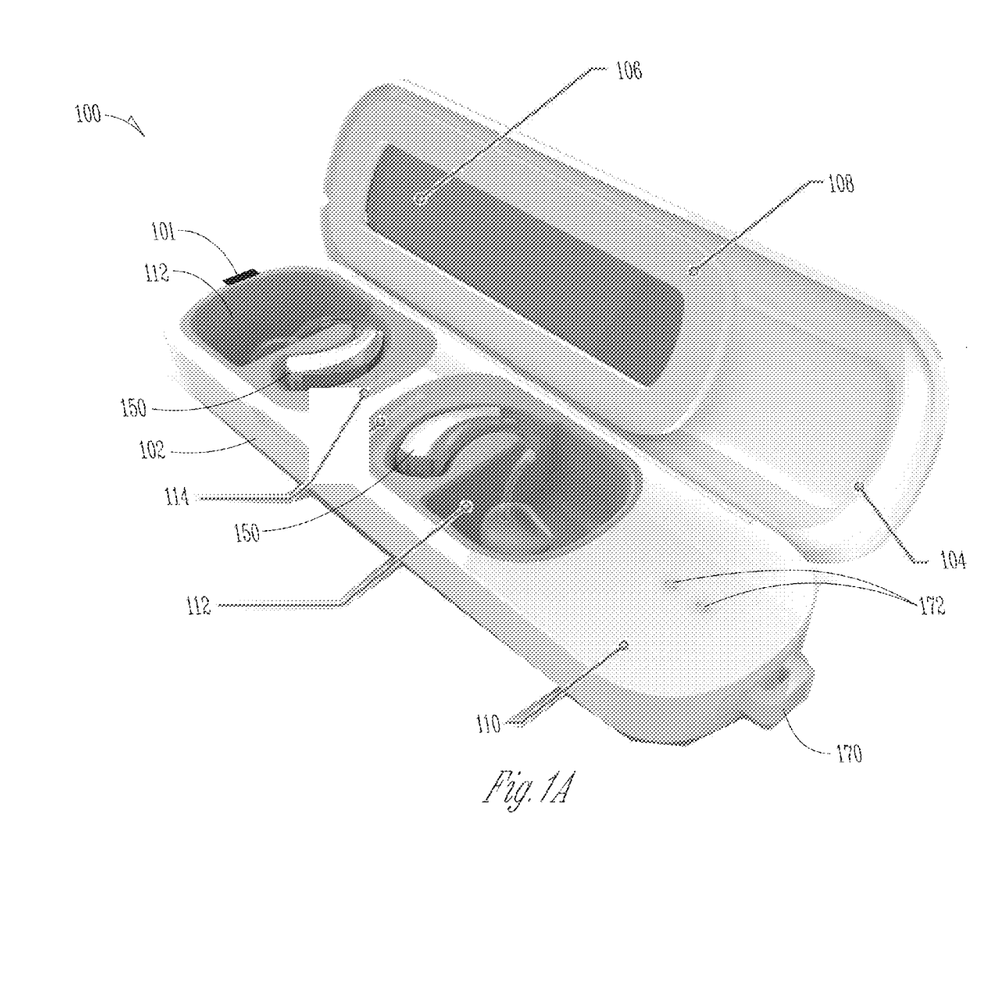
FIGS. 1A-1B illustrates a battery recharger for a hearing assistance device, according to one embodiment of the present subject matter.
Figure 1B:
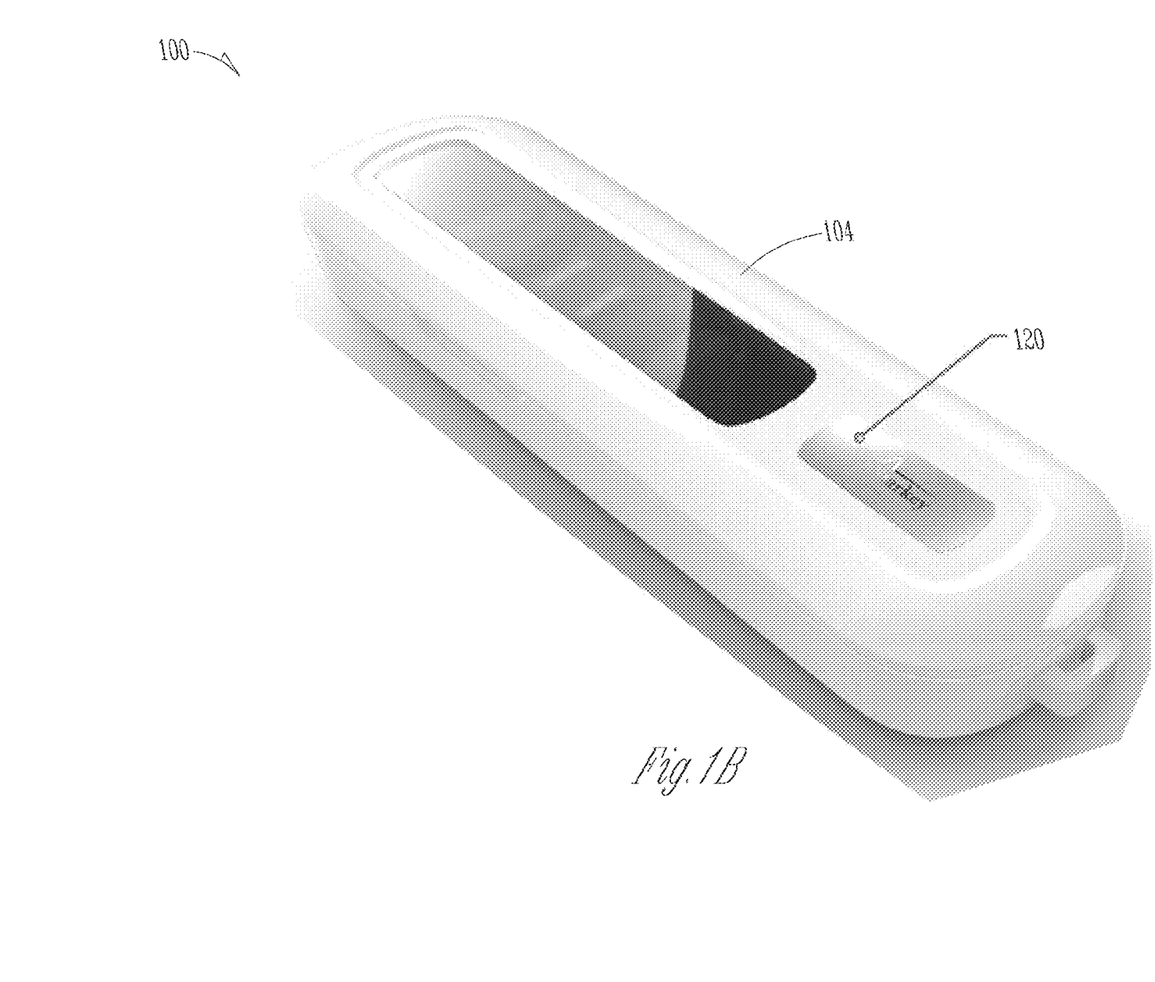

FIGS. 1A-1B illustrates a battery recharger system for a hearing assistance device, according to one embodiment of the present subject matter. FIG. 1A shows the battery recharger 100 with a base 102 and a lid 104, where the lid 104 is in the open position. Various embodiments of the recharger 100 do not include a lid. The lid 104 includes a lens 106 and a lid pad 108 in various embodiments. The lens 106 can include clear or tinted plastic, in various embodiments. Other types of lenses may be used without departing from the scope of this disclosure. According to various embodiments, the lid 104 and/or base 104 is vented to provide air circulation and prevent overheating. In various embodiments, the system includes a fan for cooling. In various embodiments other cooling mechanisms are employed. The lid pad 108 can include a die cut foam and/or a radio frequency (RF) welded fabric pad, in various embodiments. In various embodiments, the lid 104 includes a molded gloss plastic with a snapped or glued lens. The lid 104 includes an insert-molded lens, in an embodiment. In various embodiments, the lid 104 includes a clear tinted plastic with a printed graphic in a gloss or textured finish. In various embodiments, the lid includes a method to stabilize the hearing assistance devices when the lid is in a closed state.

The base 102 of the recharger 100 includes a housing 110 that includes a molded plastic or painted gloss plastic material, in various embodiments. The base 102 further includes one or more device compartments 112 configured to receive a hearing assistance device or devices 150. The device compartments 112 include soft touch paint and double-shot insert molded or textured material, in various embodiments. In various embodiments, the recharger 100 includes a user interface such as light-emitting diode (LED) light pipes 114 to provide an indication to the user of battery status for each device 150. In various embodiments, the LEDs 114 can be a series of pipes, in the shape of a battery, or other appropriate shapes, and can include a clear plastic or silicon material. The recharger 100 includes a loop 170, in an embodiment. The loop 170 can be used to assist in handling the recharger 100, in an embodiment. In various embodiments, the loop 170 can be used to assist in inserting or removing a spare battery holder, such as the spare battery holder shown in FIG. 1C. In various embodiments, the loop can be used to attach a the charging device to a keyring. In embodiments of the recharger 100 that include a spare battery holder, battery holder/charger LED lights 172 provide a user indication of battery status for batteries in the spare battery charger. The recharger 100 also includes a USB adapter port 101 configured to connect to a USB adapter, and the USB adapter is configured to provide power to the recharger.

FIG. 1B shows the battery recharger 100 where the lid 104 is in the closed position. The lid 104 includes a logo treatment 120, in an embodiment. The logo treatment 120 can include an electroformed metal badge, an engraved metal badge or a molded or textured logo, in various embodiments.

Figure 1C:
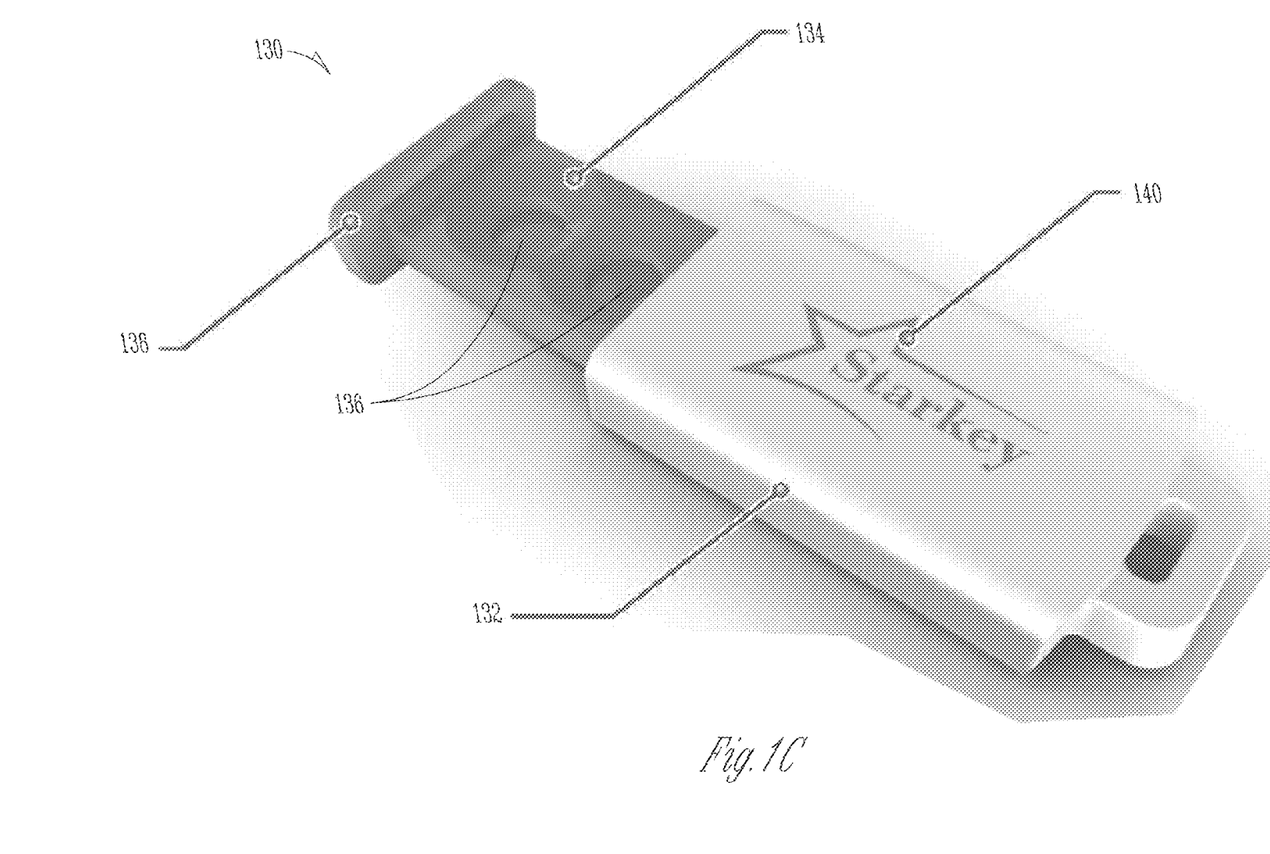
FIG. 1C illustrates a spare battery holder of a battery recharger for a hearing assistance device, according to one embodiment of the present subject matter.

FIG. 1C illustrates a spare battery holder 130 of a battery recharger for a hearing assistance device, according to one embodiment of the present subject matter. In various embodiments, the spare battery holder includes a spare battery charger function. In various embodiments, the device can charge hearing assistance device batteries and spare batteries simultaneously. The spare battery holder 130 includes a housing 132 and a battery drawer 134, in various embodiments. The drawer 134 includes one or more battery compartments 136 configured to hold hearing aid batteries, a drawer cap 138 and includes a molded plastic in various embodiments. The drawer cap 138 includes a double shot textured or soft touch end cap to match device compartments 112 from FIG. 1A, in various embodiments. The housing 132 includes a molded plastic or painted gloss material, and can include a USB connector in various embodiments. The housing 132 can also include a logo 140 including a pad printed graphic, in various embodiments.

Figure 2A:
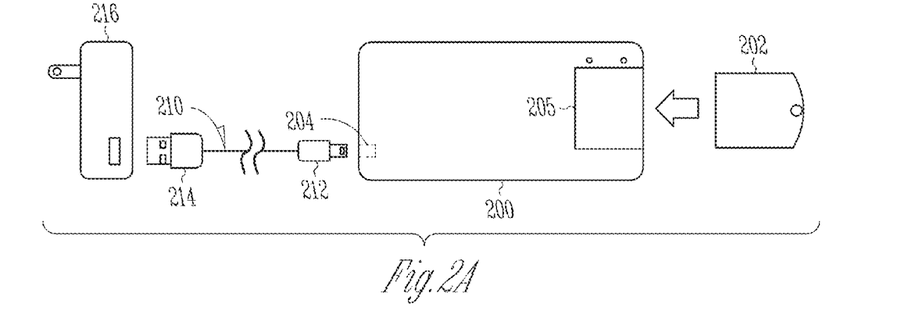
FIGS. 2A-2G illustrate system schematics for recharging hearing aid batteries using a USB adapter, according to various embodiments of the present subject matter.
Figure 2B:
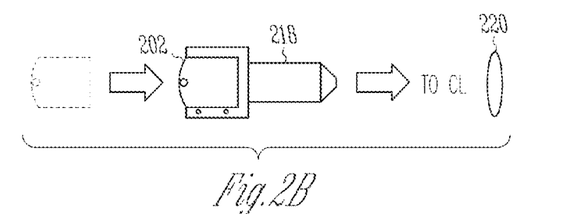
Figure 2C:
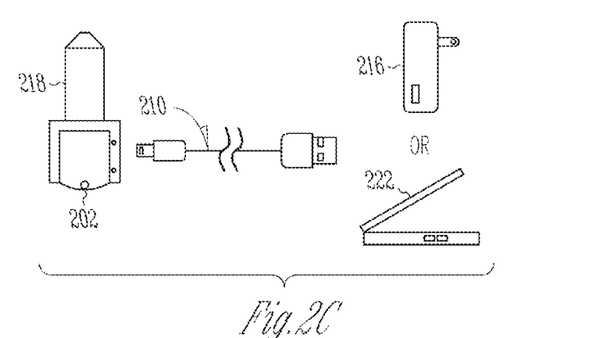
Figure 2D:
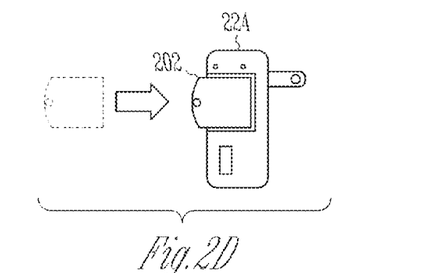
Figure 2E:
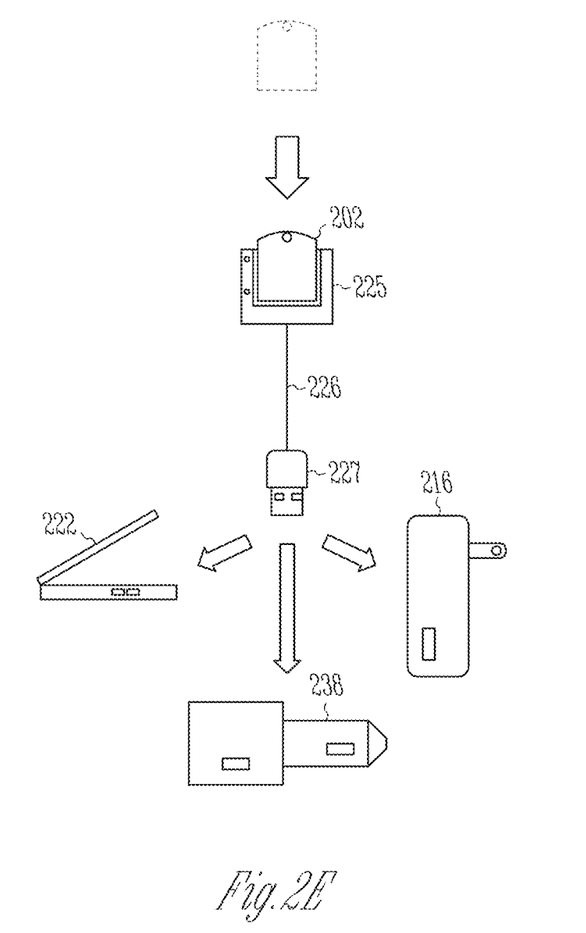

FIGS. 2A-2G illustrate system schematics for recharging hearing aid batteries using a USB adapter, according to various embodiments of the present subject matter. FIG. 2A illustrates a recharger 200 that is configured for charging one or more cells in the spare battery holder 202. Such charging can performed using different methods and apparatus, including, but not limited to, inductive charging and charging by contacts. The recharger 200 includes a USB adapter port 204 configured to connect to a USB adapter, and the USB adapter is configured to provide power to the recharger. The USB adapter port 204 includes a micro-USB female connector, in the depicted embodiment. The USB adapter port 204 can include a USB connector port, a mini-USB connector port, or any other type of port that will connect to and receive USB-standard power signals, in various embodiments. A USB cable 210 (or off-the-shelf USB cable) is shown having a micro-USB male connector 212 on one end and a USB male connector 214 on the opposite end. The USB connector 214 can be connected to a wall adapter 216 (or off-the-shelf wall adapter) to provide power to the recharger 200, in an embodiment. In various embodiments, the USB connector 214 can be connected to a desktop computer, a laptop computer, or a cigarette lighter adapter (CLA) or any other power source that accepts a USB male connector to provide power to the recharger 200. The batteries in the charging spare battery holder 202 can be charged by insertion (drop-in, plug-in, swivel-type, drawer-type, or other) into the recharger 200 at spare battery port 205, or can be charged separately. In various embodiments, the battery can be inserted with the positive terminal up or down and the proper charging will take place. In the embodiment of FIG. 2B, the spare battery holder 202 is inserted in a custom CLA 218 and charged in a vehicle's cigarette lighter 220. In the embodiment of FIG. 2C, the custom CLA 218 includes a USB port that accepts a USB cable 210, and the spare battery holder 202 is charged using a wall adapter 216 or computer 222. In the embodiment of FIG. 2D, the spare battery holder 202 is inserted into and charged using a custom wall adapter 224. In the embodiment of FIG. 2E, the spare battery holder 202 is inserted into a portable component 226 that includes a spare battery port 225 connected to a USB male connector 227. The USB male connector can then be connected to the female USB connector of a wall adapter 216, a CLA adapter 238 or a computer 222 to provide power to the recharger 200. It is understood that various charging approaches can be used including contact charging and inductive charging.

Figure 2F:
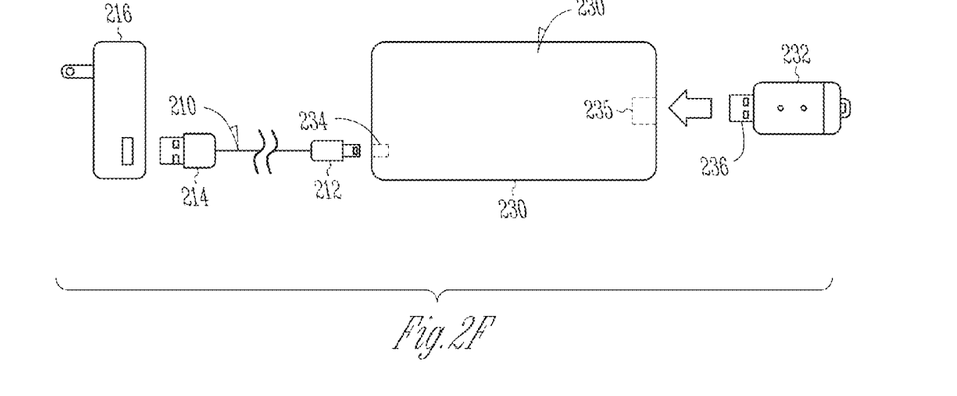
Figure 2G:
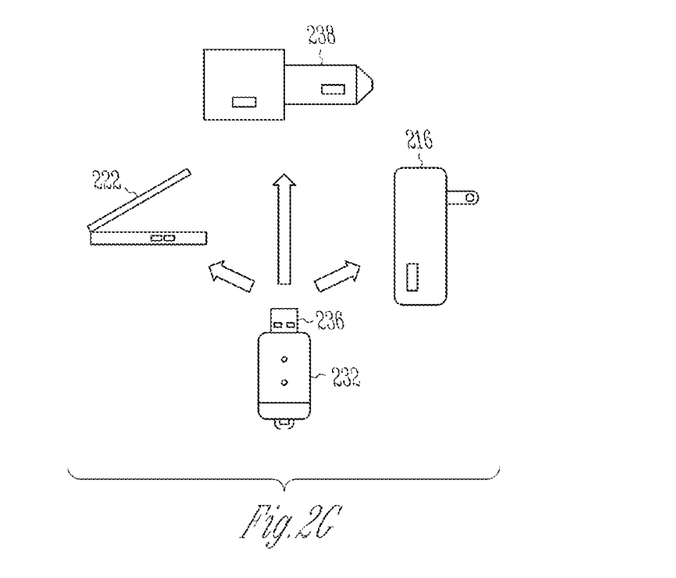

FIG. 2F illustrates a recharger 230 that is configured for a USB-charged spare battery holder 232. The recharger 230 includes a USB adapter port 234 configured to connect to a USB adapter, and the USB adapter is configured to provide power to the recharger. The USB adapter port 234 includes a micro-USB female connector, in the depicted embodiment. The USB adapter port 234 can include a USB connector port, a mini-USB connector port, or any other type of port that will connect to and receive USB-standard power signals, in various embodiments. A USB cable 210 (or off-the-shelf USB cable) is shown having a micro-USB male connector 212 on one end and a USB male connector 214 on the opposite end. The USB connector 214 can be connected to a wall adapter 216 (or off-the-shelf wall adapter) to provide power to the recharger 230, in an embodiment. In various embodiments, the USB connector 214 can be connected to a desktop computer, a laptop computer, or a cigarette lighter adapter (CLA) or any other power source that accepts a USB connector to provide power to the recharger 230. The batteries in the USB-charged spare battery holder 232 (the holder 232 including a USB male connector 236) can be charged by insertion (plugged-in) into the recharger 230 at spare battery USB female port 235, or can be charged separately. In the embodiment of FIG. 2G, the USB male connector 236 of spare battery holder 232 is inserted into a standard (off-the-shelf) CLA 238 and charged in a vehicle's cigarette lighter 220. In another embodiment, the USB male connector 236 of spare battery holder 232 is inserted into and charged using a standard (off-the-shelf) USB wall adapter 216 or computer 222. This embodiment has the benefit of not using custom CLA or wall adapters.

Figure 3A:
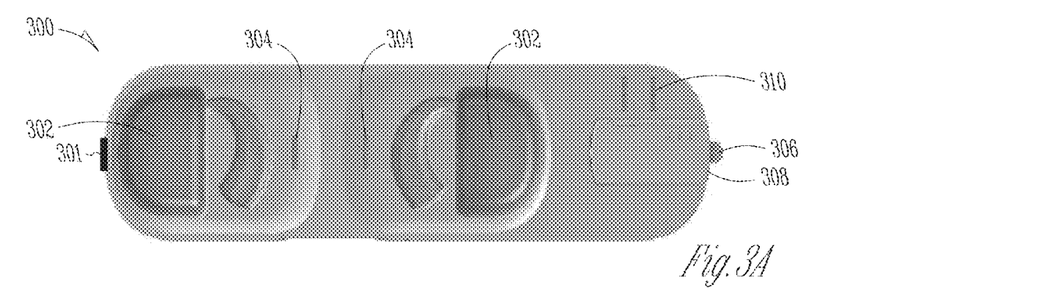
FIGS. 3A-3D illustrate battery rechargers for a hearing assistance device, according to various embodiments of the present subject matter.

FIGS. 3A-3D illustrate battery rechargers for a hearing assistance device, according to various embodiments of the present subject matter. FIG. 3A shows a battery recharger 300 including one or more device compartments 302 configured to receive a hearing assistance device or devices. In various embodiments, the recharger 300 includes a user interface such as light-emitting diode (LED) 304 to provide an indication to the user of battery status for each device. In the depicted embodiment, the LEDs 304 are shaped like a series of pipes. The recharger 300 includes a loop or tab 306, in an embodiment. The tab 306 can be used to assist in handling the recharger 300, in an embodiment. In various embodiments, the tab 306 can be used to assist in inserting or removing a spare battery holder 308, such as the spare battery holder shown in FIG. 1C. In embodiments of the recharger 300 that include a spare battery holder 308, battery holder LED lights 310 provide a user indication of battery status for batteries in the spare battery holder. The recharger 300 also includes a USB adapter port 301 configured to connect to a USB adapter, and the USB adapter is configured to provide power to the recharger.

Figure 3B:
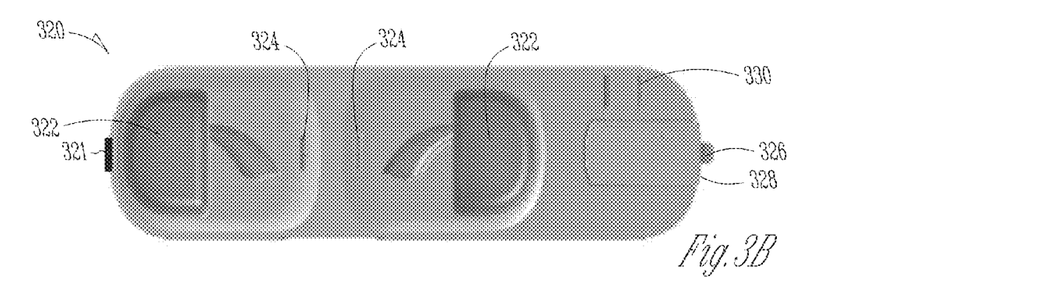

FIG. 3B shows a battery recharger 320 including one or more device compartments 322 configured to receive a hearing assistance device or devices. In various embodiments, the recharger 320 includes a user interface such as light-emitting diode (LED) 324 to provide an indication to the user of battery status for each device. In the depicted embodiment, the LEDs 324 are shaped like a series of pipes. The recharger 320 includes a loop or tab 326, in an embodiment. The tab 326 can be used to assist in handling the recharger 320, in an embodiment. In various embodiments, the tab 326 can be used to assist in inserting or removing a spare battery holder 328, such as the spare battery holder shown in FIG. 1C. In embodiments of the recharger 320 that include a spare battery holder 328, battery holder LED lights 330 provide a user indication of battery status for batteries in the spare battery holder. The recharger 320 also includes a USB adapter port 321 configured to connect to a USB adapter, and the USB adapter is configured to provide power to the recharger.

Figure 3C:
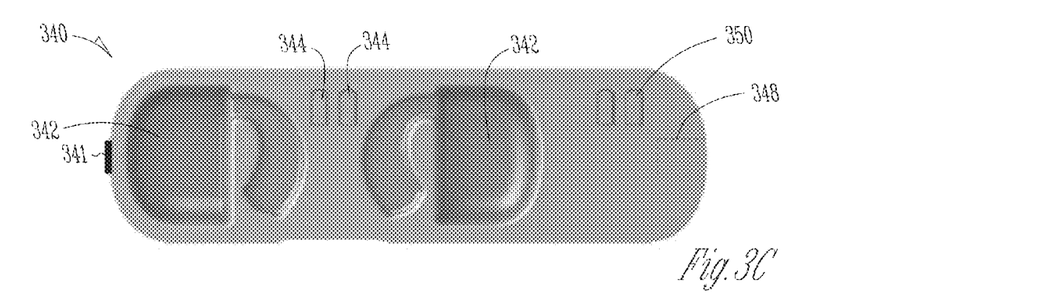

FIG. 3C shows a battery recharger 340 including one or more device compartments 342 configured to receive a hearing assistance device or devices. In various embodiments, the recharger 340 includes a user interface such as light-emitting diode (LED) 344 to provide an indication to the user of battery status for each device. In the depicted embodiment, the LEDs 304 are shaped like a battery. In embodiments of the recharger 300 that include a spare battery holder 348, battery holder LED lights 350 provide a user indication of battery status for batteries in the spare battery holder. The recharger 340 also includes a USB adapter port 341 configured to connect to a USB adapter, and the USB adapter is configured to provide power to the recharger.

Figure 3D:
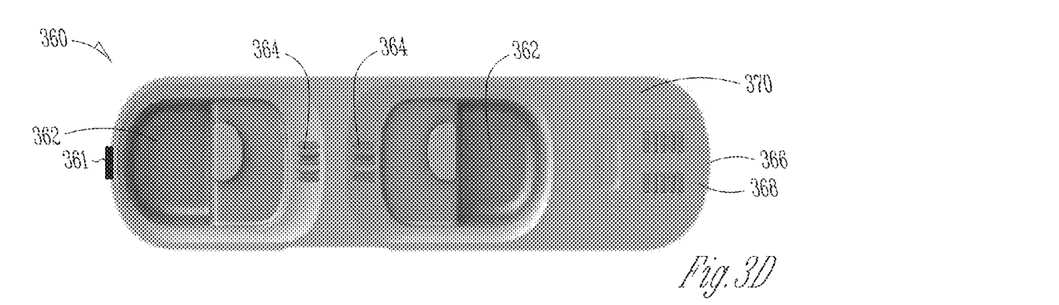

FIG. 3D shows a battery recharger 360 including one or more device compartments 362 configured to receive a hearing assistance device or devices. In various embodiments, the recharger 300 includes a user interface such as light-emitting diode (LED) 364 to provide an indication to the user of battery status for each device. In the depicted embodiment, the LEDs 364 are a series of horizontal indicator lines. In embodiments of the recharger 360 that include a spare battery holder 368, battery holder LED lights 370 provide a user indication of battery status for batteries in the spare battery holder. The recharger 360 also includes a USB adapter port 361 configured to connect to a USB adapter, and the USB adapter is configured to provide power to the recharger.

Figure 4A:
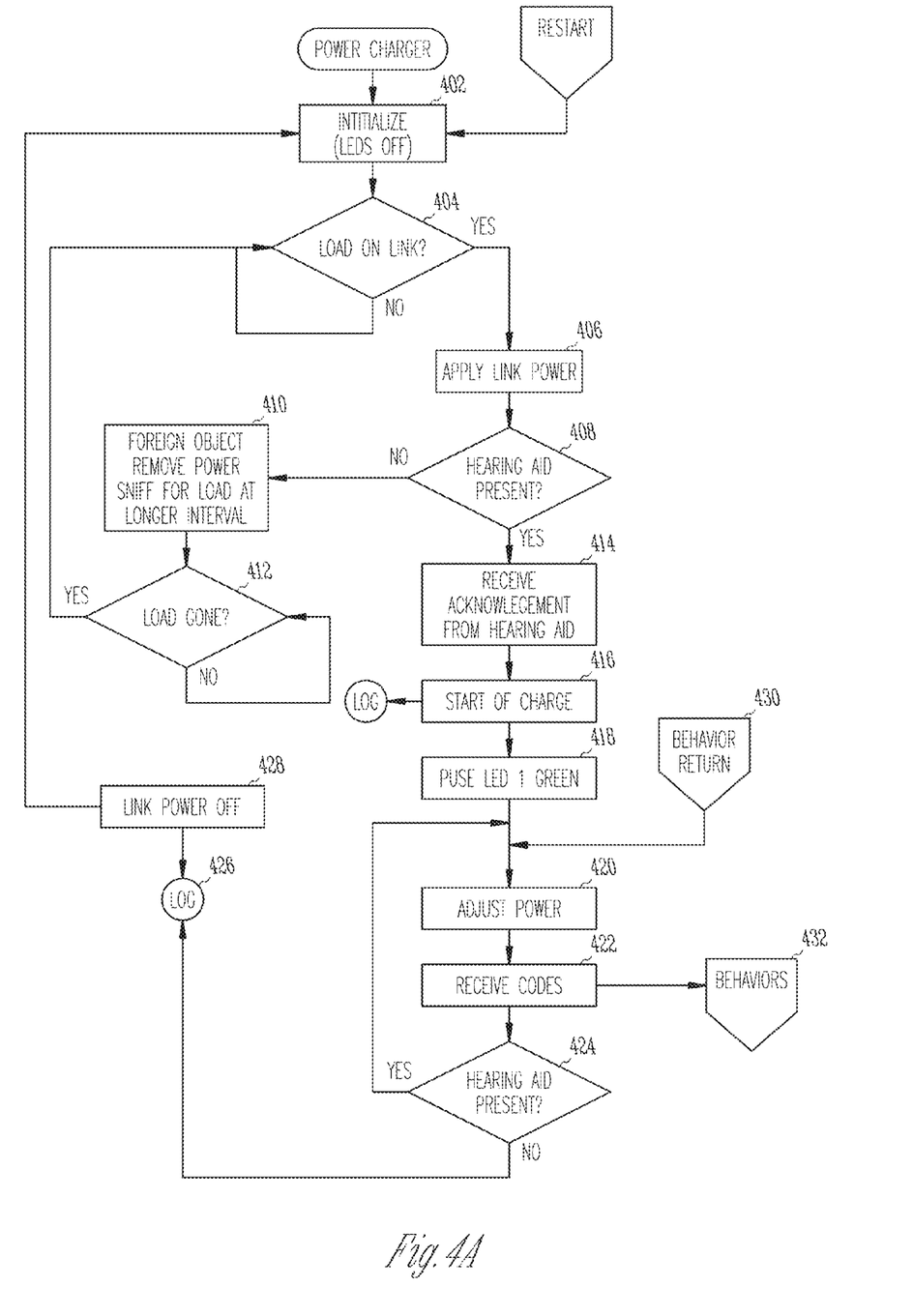
FIGS. 4A-4C illustrate flow diagrams of methods for recharging hearing aid batteries using a USB adapter, according to various embodiments of the present subject matter.
Figure 4B:
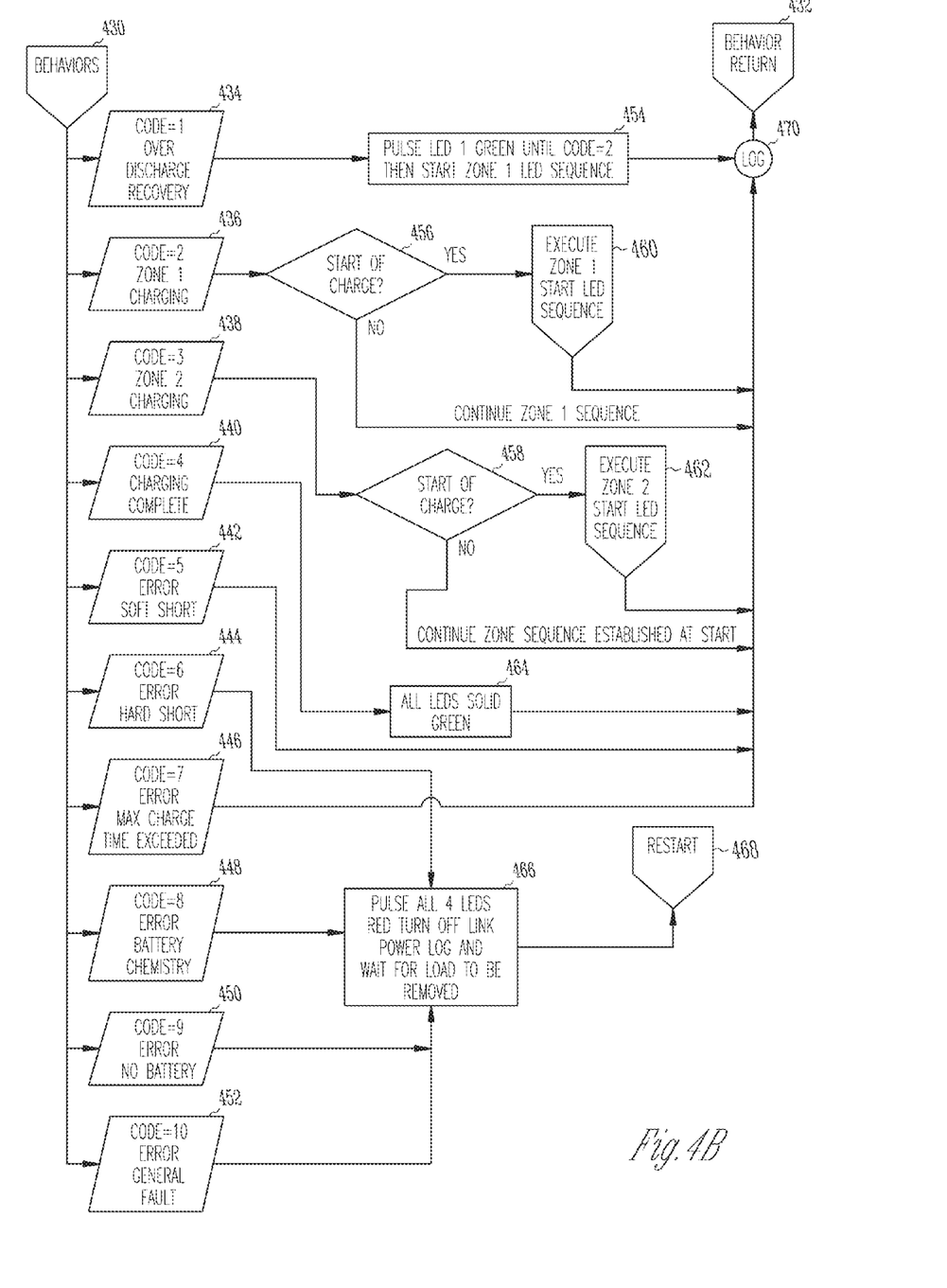
Figure 4C:
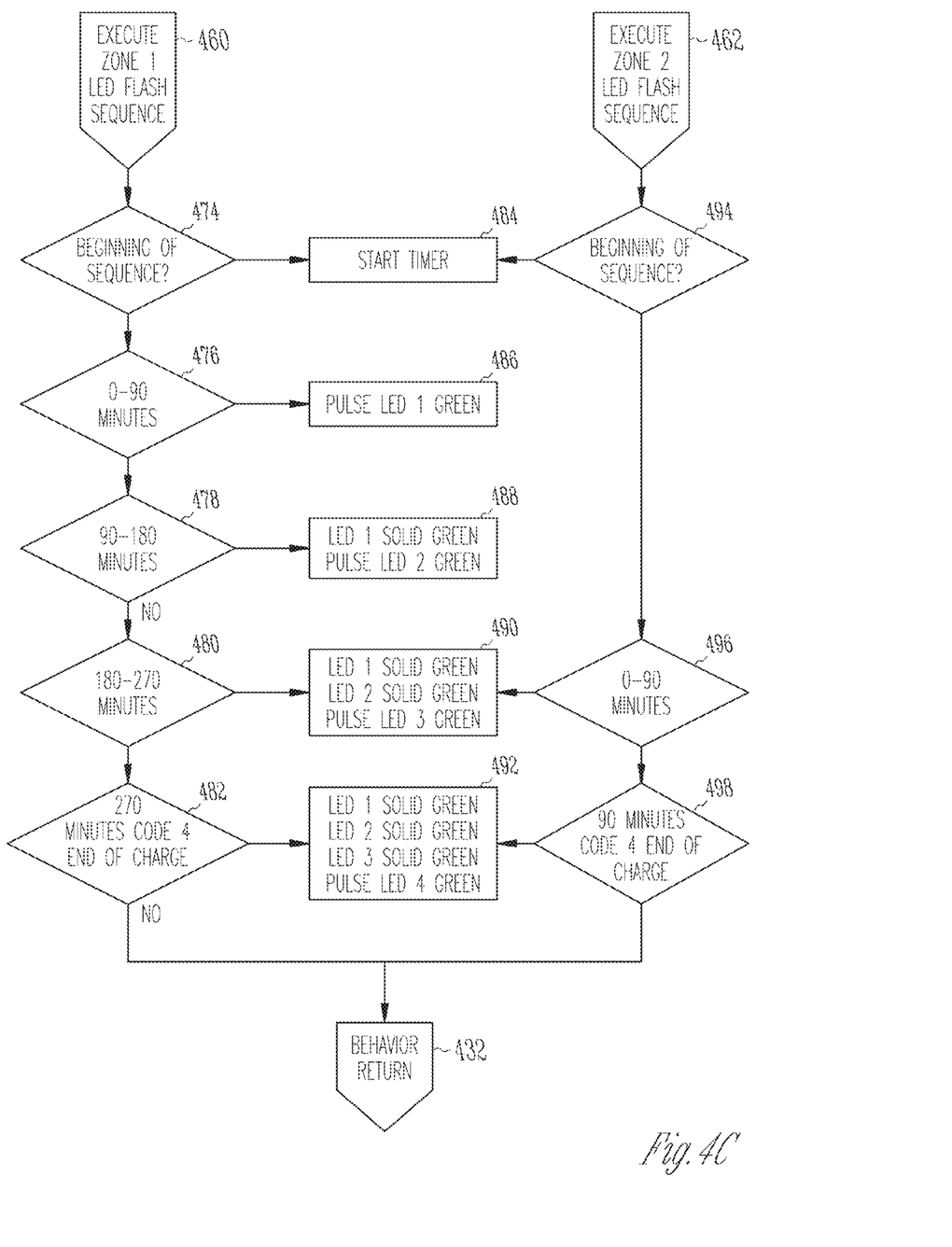

FIGS. 4A-4C illustrate flow diagrams of methods for recharging hearing aid batteries using a USB adapter, according to various embodiments of the present subject matter. In FIG. 4A, the LEDs are turned off to initialize the system at 402, and a continued check is made for a load on the inductive link at 404. If a load is found, power is applied to the device compartment at 406. If a hearing aid is present at 408 via an acknowledgment from the hearing aid at 414, a charge is started at 416. If no hearing aid is present, a foreign object is present at 410, and when the object is removed at 412 the check for a load continues at 404. Thus, if there is no response from a hearing aid, the recharger turns off power to that device compartment and "sniffs" (checks for a load) at a longer duty cycle until the load (foreign object) is removed. When a response is received from the hearing aid, the recharger maintains power, begins LED interface operation and data logs events transmitted from the hearing aid. The LED 1 is pulsed green at 418 for a charge and power is adjusted at 420 and codes received at 422. Based on the codes received, behaviors 432 are performed (FIGS. 4B and 4C below). When the hearing aid is present at 424, power is adjusted to recharge the device battery. When charging is complete, the recharger maintains the LED status indication (or error indication) and data logs charge completion. When the hearing aid is removed at 424, the events are logged at 426, the inductive link is powered off at 428, and the system is initialized at 402 to resume sniff for a load at the device compartment.

In FIG. 4B, various codes from the hearing aid battery are represented by LED display at the user interface. If the battery is over discharge recovery at 434, the first LED is pulsed green until charging begins, then the LED sequence is initiated at 454. When charging begins at 436, if charge has started at 456, then LED sequence 460 is initiated. When charging begins at 438, if charge has started at 458, then LED sequence 462 is initiated. When charging is complete at 440, all LEDs are solid green, and the user can remove the hearing aid from the recharger. If a soft short is detected at 442 or max charge time is exceeded at 446, the error is logged at 470. If a hard short is detected at 444, or a battery chemistry error is detected at 448, or no battery is detected at 450, or a general fault is detected at 452, all 4 LEDs are pulsed red, inductive link power is turned off, data is logged and the system waits for the load to be removed at 466 and a restart is initiated at 468.

FIG. 4C illustrates the LED flash sequences (460, 462) discussed above. Zone 1 LED flash sequence 460 begins at 474 and starts a timer at 484. For 0-90 minutes 476, LED 1 is pulsed green at 486. For 90-180 minutes 478, LED 1 is solid green and LED 2 is pulsed green at 488. For 180-270 minutes 480, LED 1 is solid green, LED 2 is solid green and LED 3 is pulsed green at 490. For 270 minutes until end of charge 482, LED 1 is solid green, LED 2 is solid green, LED 3 is solid green and LED 4 is pulsed green at 492. When battery is charged, the routine returns to 432. Zone 2 LED flash sequence 462 begins at 494 and starts a timer at 484. For 0-90 minutes 496, LED 1 is solid green, LED 2 is solid green and LED 3 is pulsed green at 490. For 90 minutes until end of charge 498, LED 1 is solid green, LED 2 is solid green, LED 3 is solid green and LED 4 is pulsed green at 492. When battery is charged, the routine returns to 432.

The flow diagrams of FIGS. 4A-4C represent computer software which executes on charging circuitry in the hearing aid when placed on the recharger, in an embodiment. The charging circuitry communicates with circuitry in the battery recharger, in various embodiments. The hearing aid passes codes back to the recharger to control power transfer and communicate progress and errors back to the recharger, in various embodiments. In other embodiments, the software can execute on the recharger, or on a combination of the recharger and the hearing aid. The software is designed to detect the type of battery installed at in the hearing aid and set battery low thresholds appropriate to the chemistry, in various embodiments. This accommodates the use of Zn-Air cells as well as Ag—Zn cells without compromising Zn-Air battery life, in an embodiment. In various embodiments, the charging circuitry automatically disconnects power from the hearing aid when it is placed in the recharger and turns power back on again when the hearing aid is removed.

The recharger simultaneously charges two hearing aids equipped with the charging circuitry, in an embodiment. Spare cells can be charged as well in various embodiments. Other numbers of hearing aids can be accommodated without departing from the scope of this disclosure. In on embodiment, the user interface includes 4 LEDs for each charging compartment, configured, colored and mapped to charging progress and errors per the flow diagrams of FIGS. 4A-4C, referenced above. Charging progress and error information is transmitted from the hearing aid to the recharger by the charging circuitry. The recharger interprets the codes to control the display and charging link, in various embodiments.

The present subject matter provides improved charging for rechargeable batteries of behind-the-ear (BTE) hearing aids, in the depicted embodiments. BTE hearing aids are only one type of hearing assistance device. It is understood that their use in the description is intended to demonstrate the present subject matter, but not in a limited or exclusive or exhaustive sense. Other hearing assistance devices include, but are not limited to, those in this document.

The present subject matter is beneficial for charging rechargeable batteries such as Ag—Zn batteries and Zn-Air batteries. In addition, other rechargeable batteries can be used without departing from the scope of this disclosure. The present subject matter provides the further benefit of a small form factor recharger that provides charging without removing batteries from the hearing assistance device. This benefits a user by saving time and effort that would be involved in removing the batteries for recharging. Because many users have two devices (one for each ear), the savings in time and effort is compounded. A USB-compatible female connector in the recharger mates with a USB adapter or dongle to provide a user access to power from a variety of sources using off-the-shelf USB adapters such as wall-outlet adapters, CLA adapters and any computer with a USB-compatible female connector. Thus, the user has a number of options to recharge the hearing assistance device batteries.

It is further understood that any hearing assistance device may be used without departing from the scope and the devices depicted in the figures are intended to demonstrate the subject matter, but not in a limited, exhaustive, or exclusive sense. It is also understood that the present subject matter can be used with a device designed for use in the right ear or the left ear or both ears of the wearer.

The present subject matter is demonstrated for hearing assistance devices, including hearing aids, including but not limited to, behind-the-ear (BTE), in-the-ear (ITE), in-the-canal (ITC), receiver-in-canal (RIC), or completely-in-the-canal (CIC) type hearing aids. It is understood that behind-the-ear type hearing aids may include devices that reside substantially behind the ear or over the ear. Such devices may include hearing aids with receivers associated with the electronics portion of the behind-the-ear device, or hearing aids of the type having receivers in the ear canal of the user, including but not limited to receiver-in-canal (RIC) or receiver-in-the-ear (RITE) designs. Designs including tele-coils in the canal, GMR devices in the canal, and various combinations of them with microphone(s) and/or receiver(s) are contemplated as well. The present subject matter can also be used in hearing assistance devices generally, such as cochlear implant type hearing devices and such as deep insertion devices having a transducer, such as a receiver or microphone, whether custom fitted, standard, open fitted or occlusive fitted. It is understood that other hearing assistance devices not expressly stated herein may be used in conjunction with the present subject matter.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A battery recharger system, comprising:
 a spare battery recharger, the battery recharger including circuitry to recharge one or more individual spare rechargeable battery cells for a hearing assistance device, the battery recharger including:
  a housing configured to receive the one or more individual uninstalled rechargeable battery cells, the housing configured to cover the one or more individual spare rechargeable battery cells received in the housing; and
  a male USB connector configured for direct connection with a female power supply USB connector to receive power;
 a hearing assistance device recharger, separable from the spare battery recharger, comprising:
  a power connector to receive power;
  a female USB connector adapted to dock with the male USB connector and provide power to the spare battery recharger;
  a transmit coil configured to transmit power across a wireless inductive link;

a device compartment configured to receive at least one hearing assistance device, the at least one hearing assistance device comprising:
  an installed rechargeable battery interchangeable with the one or more individual spare rechargeable battery cells;
  a recharge coil configured to receive power across the wireless inductive link; and
  charging circuitry configured to control power received by the recharge coil to recharge the installed rechargeable battery.

2. The battery recharger system of claim 1, further comprising a user interface configured to visually communicate at least one of charging progress and error information received by the spare battery recharger, wherein the user interface comprises at least one light emitting diode.

3. The battery recharger system of claim 1, wherein the spare battery recharger and the hearing assistance device recharger are configured to recharge the one or more individual spare rechargeable battery cells and the installed rechargeable battery simultaneously.

4. The battery recharger system of claim 2, wherein the user interface is a first user interface, the system further comprising:
  a second user interface configured to communicate at least one of charging progress and error information received by the hearing assistance device recharger.

5. The battery recharger system of claim 1, wherein the male USB connector is configured to dock with and receive power from a USB wall adapter, a computer, or a cigarette lighter in a vehicle.

6. The battery recharger system of claim 1, wherein the spare battery recharger includes a battery drawer configured to receive the one or more individual spare rechargeable battery cells.

7. A recharging device comprising:
  a spare battery recharger for recharging one or more spare rechargeable battery cells for a hearing assistance device, the spare battery recharger comprising:
    a battery drawer configured to receive the individual one or more spare rechargeable battery cells;
    a housing configured to slidingly receive the battery drawer, the housing configured to cover the individual one or more spare rechargeable battery cells received in the battery drawer; and
    a male USB connector configured to dock with and to receive power directly from a USB wall adapter, a computer, or a cigarette lighter in a vehicle;
  a hearing assistance device recharger, separable from the spare battery recharger, the hearing assistance device recharger comprising:
    a power connector to receive power;
    a female USB connector adapted to connect with the spare battery recharger;
    a transmit coil configured to transmit power across a wireless inductive link;
    a device compartment configured to receive at least one hearing assistance device, the at least one hearing assistance device comprising:
      an installed rechargeable battery interchangeable with the one or more spare rechargeable battery cells;
      a recharge coil configured to receive power across the wireless inductive link; and
      charging circuitry configured to control power received by the recharge coil to recharge the installed rechargeable battery.

8. The device of claim 7, wherein the spare battery recharger and the hearing assistance device recharger are configured to recharge the respective one or more spare rechargeable battery cells and the installed rechargeable battery simultaneously.

9. The device of claim 7, further comprising:
  a user interface configured to communicate at least one of charging progress and error information regarding at least the one or more spare rechargeable battery cells or the installed rechargeable battery,
  wherein the user interface comprises at least one light emitting diode.

10. The recharging device of claim 7, wherein the recharging device is configured to receive power from a USB wall adapter.

11. The recharging device of claim 7, wherein the recharging device is configured to receive power from a computer.

12. A portable recharging device, comprising:
  a hearing assistance device recharger comprising:
    a power connector to receive power;
    a transmit coil configured to transmit power across a wireless inductive link;
    a device compartment configured to receive at least one hearing assistance device, the at least one hearing assistance device comprising:
      an installed rechargeable battery;
      a recharge coil configured to receive power across the wireless inductive link; and
      charging circuitry configured to control power received by the recharge coil to recharge the installed rechargeable battery;
    a first spare battery connector;
  a spare battery recharger, separable from and dockable with the hearing assistance device recharger, for recharging one or more spare rechargeable battery cells for a hearing assistance device, wherein the spare rechargeable battery cells are interchangeable with the installed rechargeable battery, the spare battery recharger comprising:
    a housing configured to cover the individual one or more spare rechargeable battery cells received in the battery drawer;
    a second spare battery connector configured to dock with the first spare battery connector to receive power from the hearing assistance device recharger; and
    charging circuitry configured to control power received by the hearing assistance device recharger to recharge the one or more spare rechargeable battery cells.

13. The system of claim 12, wherein the recharging device is configured to receive power from a USB wall adapter.

14. The system of claim 12, wherein the recharging device is configured to receive power from a computer.

15. The system of claim 12, wherein the battery recharger and the hearing assistance device recharger are configured to recharge the one or more individual spare rechargeable battery cells and the installed rechargeable battery simultaneously.

16. The system of claim 12, further comprising:
  a user interface configured to communicate at least one of charging progress and error information received by the recharging device,
  wherein the user interface comprises at least one light emitting diode.

17. The system of claim 16, wherein the user interface is a first user interface, the system further comprising:

a second user interface configured to communicate at least one of charging progress and error information received by the hearing assistance device recharger from the charging circuitry,
wherein the second user interface comprises at least one light emitting diode.

18. The system of claim 16, further comprising a lid movably coupled to the hearing assistance device recharger, the lid includes a closed configuration and an open configuration, wherein in the closed configuration, the lid covers the device compartment, and in the open configuration, at least one hearing assistance device is installable or removable from the device compartment.

19. The system of claim 12, wherein the first spare battery connector and the second spare battery connector are USB connectors.

20. The system of claim 12, further comprising the spare battery recharging including a battery drawer configured to receive the individual one or more spare rechargeable battery cells, the housing configured to slidingly receive the battery drawer.

* * * * *